United States Patent
Yamaura et al.

(10) Patent No.: US 6,785,800 B1
(45) Date of Patent: Aug. 31, 2004

(54) SINGLE INSTRUCTION STREAM MULTIPLE DATA STREAM PROCESSOR

(75) Inventors: Shin-ichi Yamaura, Hyogo-ken (JP); Kazuhiko Hara, Hyogo-ken (JP); Takao Katayama, Hyogo-ken (JP); Kazuhiko Iwanaga, Osaka-fu (JP); Hiroshi Takafuji, Osaka-fu (JP)

(73) Assignee: Ricoh Company, Ltd. (JP)

( * ) Notice: Subject to any disclaimer, the term of this patent is extended or adjusted under 35 U.S.C. 154(b) by 567 days.

(21) Appl. No.: 09/658,860

(22) Filed: Sep. 8, 2000

(30) Foreign Application Priority Data

Sep. 10, 1999 (JP) .......................................... 11-256865

(51) Int. Cl.[7] .............................................. G06F 15/80
(52) U.S. Cl. ........................................ 712/22; 712/20
(58) Field of Search ............................. 712/22, 2, 3, 4, 712/5, 7, 13, 23, 24, 20; 708/303, 209, 2, 105

(56) References Cited

U.S. PATENT DOCUMENTS

| | | | | | |
|---|---|---|---|---|---|
| 4,621,339 A | * | 11/1986 | Wagner et al. | ................ | 712/22 |
| 5,450,603 A | * | 9/1995 | Davies | ....................... | 712/22 |
| 5,475,856 A | * | 12/1995 | Kogge | ......................... | 712/20 |
| 5,729,758 A | * | 3/1998 | Inoue et al. | .................. | 712/22 |
| 5,758,176 A | * | 5/1998 | Agarwal et al. | ............. | 712/23 |
| 5,790,879 A | * | 8/1998 | Wu | .............................. | 712/19 |
| 5,815,680 A | * | 9/1998 | Okumura et al. | ........... | 710/316 |
| 5,838,985 A | * | 11/1998 | Ohki | ............................ | 712/16 |
| 5,872,988 A | * | 2/1999 | Duranton | ..................... | 712/22 |
| 6,047,366 A | * | 4/2000 | Ohara et al. | .................. | 712/14 |
| 6,052,705 A | * | 4/2000 | Iwase et al. | ................. | 708/521 |
| 6,151,668 A | * | 11/2000 | Pechanek et al. | ............. | 712/24 |
| 6,216,223 B1 | * | 4/2001 | Revilla et al. | .............. | 712/245 |

FOREIGN PATENT DOCUMENTS

| | | |
|---|---|---|
| JP | 05067203 | 3/1993 |
| JP | 06004690 | 1/1994 |

\* cited by examiner

*Primary Examiner*—Henry W. H. Tsai
(74) *Attorney, Agent, or Firm*—Dickstein Shapiro Morin & Oshinsky LLP

(57) ABSTRACT

A SIMD processor includes plural processor elements (PEs) each having a processing unit for data processing, a register for holding data to be processed or already processed by the processing unit, a data transfer bus interconnecting with other PEs, and a register controller for inputting a read or write signal to the register. Read and write processing steps in the processor are carried out by the register controller in response to the signals which are sent form the register controller and inputted into a register of specific processor elements responding to an addressing signal from an external interface. The processor is capable of transferring data directly to a specific processor element, thereby achieving higher speeds of data transfer and resultant data processing and makes flexible use of registers to thereby attain efficient data processing utilizing arbitrary combinations of the register depending on bit width of the data.

18 Claims, 13 Drawing Sheets

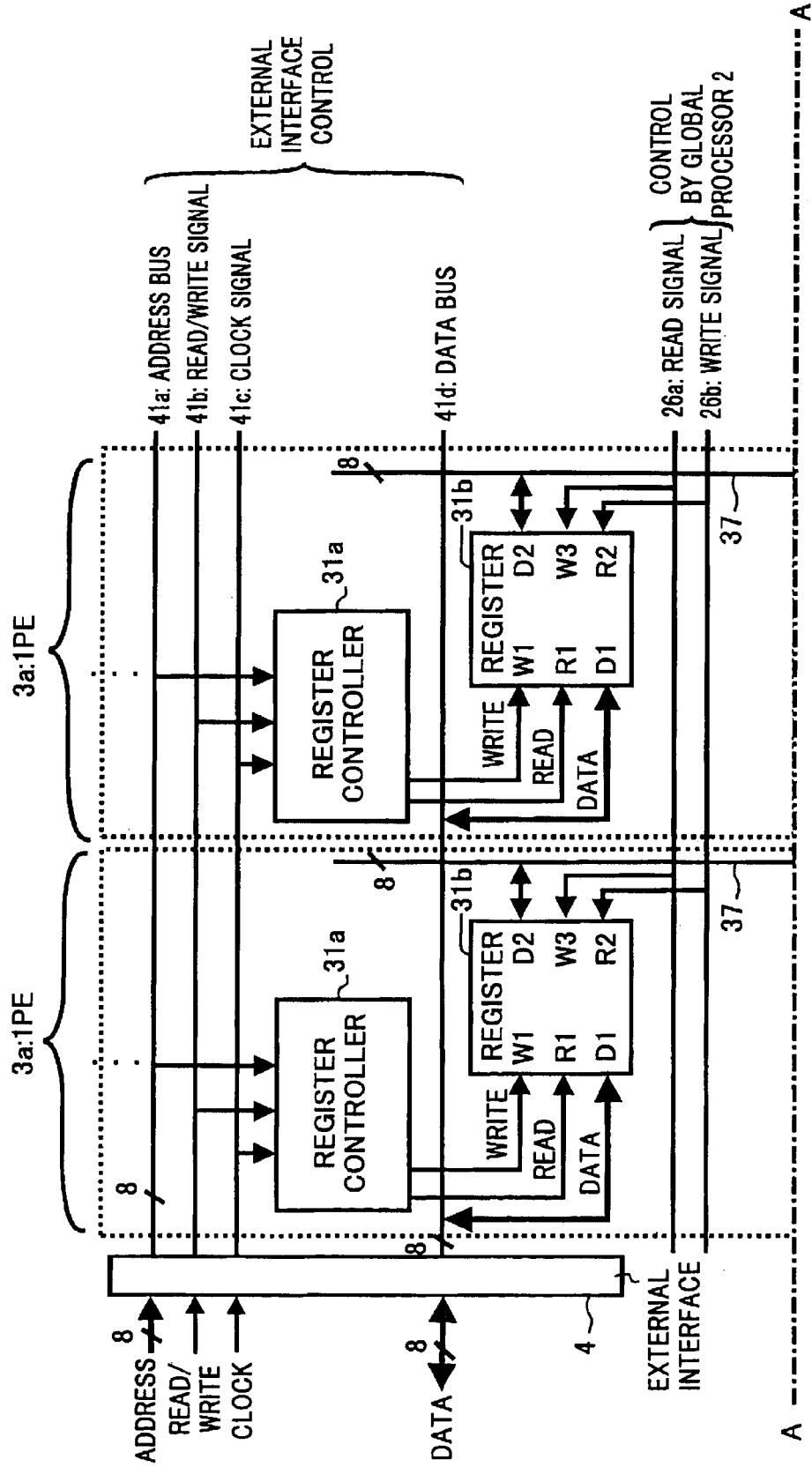

SINGLE INSTRUCTION STREAM MULTIPLE DATA STREAM PROCESSOR

BACKGROUND

1. Field

This patent specification relates to a single instruction stream multiple data stream (SIMD) processor having capability of parallel data processing for a plurality of image data by a single instruction for processing operation.

2. Discussion of the Background

As in the recent developments of digital duplication machines, facsimile apparatuses, and other similar imaging systems, more attention has been focused on the improvement on image quality with increasing the number of picture elements and adopting color images. These recent trends result in the increase in the number of image data to be processed.

The processing of image data is carried out, in general, repeating a similar set of processing steps over image data of the entire picture elements. An SIMD type processor, therefore, has been of good use with its capability of parallel data processing regarding a plurality of image data by a single instruction.

These data processing may be achieved by, for example, using a plurality of operational units aligned. It is requisite for the data to be processed be transferred with a speed comparable to data processing speed; otherwise the performance of the processor may be dictated almost entirely by speed of data access.

In a conventional single instruction single data (SISD) type processor, the data to be processed are accessed sequentially from a memory by a program instruction from the processor, and its access speed is determined by bit width of the memory and transfer time. When this method of data access is adopted for an SIMD processor, the reduction is caused in performance of the processor, since the data access is carried out sequentially at the expense of the advantage of parallel processing in the processor.

The SIMD processor is therefore configured to access to data being processed by not an instruction from a processor, but direct access from an external memory data transfer unit to an internal input/output (I/O) register in the processor. That is, simultaneously with executing processing steps, the SIMD processor is capable of transferring various data, which are subsequently processed, from an externally provided memory to an I/O register, or which are already processed, from an I/O register to a memory through a memory data transfer unit. As a result, higher speeds is attained in data processing with the SIMD processor.

The process flow of the above noted data transfer is carried out between the processor and external memory, as follows: (1) The external memory data transfer unit transfers data to be processed to the I/O register. (2) The processor instructs to transfer the data to be processed, which are already transferred from the external memory and held in the I/O register, from the I/O register to a processing register, and subsequently initiates processing steps. (3) The processor executes the processing steps. During the execution, the external memory data transfer unit transfers data to be processed next to the I/O register. In addition, when any processed data (or resultant data) are already held in the I/O register, the external memory data transfer unit transfers the resultant data from the I/O register to the external memory. And (4) upon the completion of the processing steps, the processor transfers the resultant results to the I/O register.

Increased speeds of data processing is thus attained with the SIMD processor through the above-mentioned steps of data transfer with the external memory data transfer unit, which are carried out simultaneously with processing steps.

As the methods of data transfer, there exemplified are the shift register method and serial access memory method. In the shift register method, as disclosed in Japanese Laid-Open Patent Application No. 5-67203, the data held in a register is shifted successively by bit in synchronous with input clock signals.

In the shift register method, the data which are firstly transferred are held in the register of the zero-th processor element, then shifted by one bit to be held in the register of the first processor element, and so on. Therefore, in the shift register method applied to an SIMD processor having, for example, 256 processor elements, 256 clock signals are necessary before the first transferred data be transferred to the register in the 255-th processor element.

In the serial access memory method, as disclosed in Japanese Laid-Open Patent Application No. 6-4690, an input pointer generates an input pointer signal represented by a logic "H", then input the data into the input serial access memory (SAM) of the processor element designated by "H". In this method, the input pointer signal is shifted successively by bit in synchronous with input clock signals.

In addition, during the first data transfer in the serial access memory method, the input pointer signal addresses the zero-th processor element, then data are held in the input SAM of the zero-th processor element. Subsequently, during the second data transfer, the input pointer signal, in synchronous with input clock signals, addresses the first processor element, then data are held in the input SAM of the first processor element.

Therefore, in the case of the serial access memory method applied to an SIMD processor having, for example, 256 processor elements, 256 clock signals are to be input before the data be inputted into the input SAM of the 255-th processor element.

There have been noticed several shortcomings in these methods such as, for example, data have to be transferred also to odd-numbered processor elements, even when the data are transferred only to even-numbered processor elements. Also, data have to be transferred to all of the processor elements, when the data are to be transferred only to the last half (from 128th to 255th) of the elements.

That is, the data cannot necessarily be transferred directly to specific processor elements by these methods. As result, it takes unduly long time for the data transfer, to thereby result in the reduction in data processing speeds.

In addition, in data processing with processors, in general, the bit widths vary depending on applications executed, such as widths of, an input register necessary for holding input data, an output register necessary for holding output data, and a register necessary for temporarily holding data.

The bit widths of, an input register, an output register and a register for temporarily holding data, have been fixed for previously known SIMD processors. When the bit width of the data exceeds that of the processor, therefore, processing operation of data become unfeasible, thereby resulting another disadvantage.

Further, since the bit widths are same for input and output registers for previous processors, it is necessary to access as many times as the number of the processor elements to transfer the data in all processor elements, to thereby cause still another drawback.

In addition, another drawback is noted regarding the number of line buffers, which follows. When a large number of line buffers are required for some of applications, registers contained in processor elements are utilized as the line buffers. However, since the bit width of these registers are fixed in the previously known processors, processing operation becomes unfeasible for the data, for which the bit width exceeds that of the registers.

SUMMARY

Accordingly, it is an object of the present disclosure to provide an improved processor capable of transferring data directly to a specific processor element, thereby achieving higher speeds of data transfer and resultant data processing, and making flexible use of registers to thereby attain efficient data processing utilizing an arbitrary combination of the registers depending on the bit width of data.

The following brief description is a synopsis of only selected features and attributes of the present disclosure. A more complete description thereof is found below in the section entitled "Description of the Preferred Embodiments".

A single instruction stream multiple data stream (SIMD) processor disclosed herein includes a plurality of processor elements each having a processing unit for data processing, and a data holding unit for holding data which are either to be processed or already processed by the processing unit, a data transfer bus interconnecting the processor elements, and an addressing unit for addressing a specific processor element. The data holding unit of the predetermined processor element addressed by the addressing unit carries out either acquiring or outputting data by way of the data transfer bus. The data holding unit may further be formed to include a first data holding unit for holding data to be processed and a second data holding unit for holding data already processed by the processing unit.

BRIEF DESCRIPTION OF THE DRAWINGS

In the following drawings, like references numerals will be used to refer to like elements in the various drawings, in which.

DESCRIPTION OF THE PREFERRED EMBODIMENTS

Figure 1:
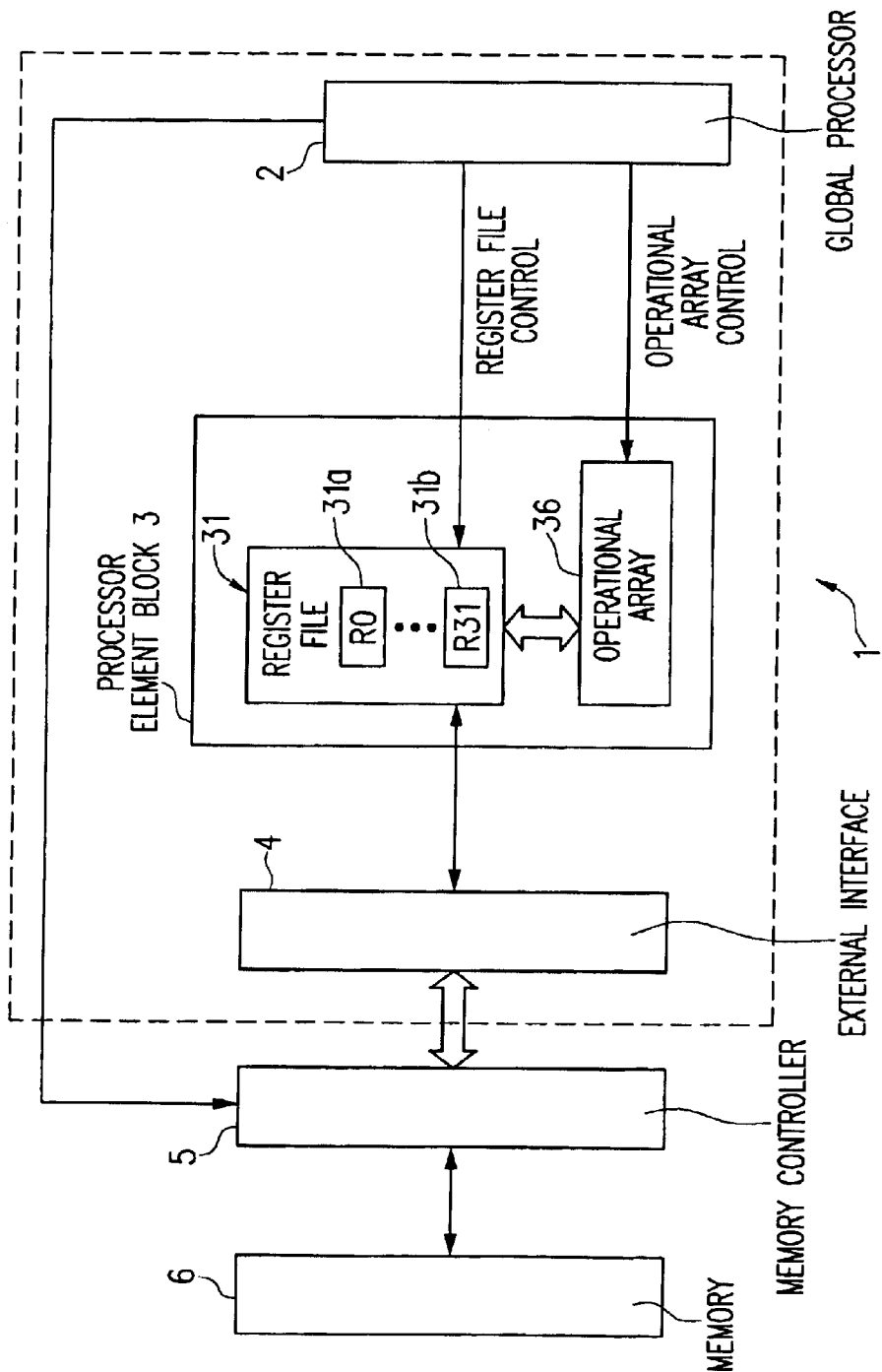
FIG. 1 is a block diagram illustrating one embodiment of the SIMD processor disclosed herein.

In the detailed description which follows, specific embodiments of the processor particularly useful in image data processing are described. It is understood, however, that the present disclosure is not limited to these embodiments. For example, it is appreciated that the processor disclosed herein may also be adaptable to any form of data processing, particularly parallel data processing. Other embodiments will be apparent to those skilled in the art upon reading the following description.

An SIMD processor disclosed herein includes a plurality of processor elements, each having a processing unit for data processing, and a data holding unit for holding data which are either to be processed or already processed by the processing unit, a data transfer bus interconnecting the processor elements, and an addressing unit for addressing a specific processor element. The SIMD processor is characterized by the data holding unit of the specific processor element, which is addressed by the addressing unit and carries out either acquiring or outputting data by way of the data transfer bus.

The data holding unit may further include a first data holding unit for holding data to be processed, and a second data holding unit for holding data already processed by the processing unit.

Since the data to be processed can be held directly in the data holding unit of the specifically addressed processor element with the above noted construction of the processor, the data can be transferred directly to a specific processor element. Likewise, when already processed data are outputted, the data can be outputted from a specific data holding unit of the addressed processor element. As a result, higher speeds are achieved for data transfer, thereby attaining also higher speeds of data processing.

According to another embodiment disclosed herein, the SIMD processor includes a plurality of processor elements each having a processing unit for data processing, and a data holding unit for holding any of data to be processed and already processed by the processing unit, a data transfer bus interconnecting the processor elements, an addressing unit for addressing a specific processor element, and a signal generating unit for inputting to the data holding unit either input signals for acquiring data to be processed from the data transfer bus to subsequently hold the data in the data holding unit or output signals for outputting processed data held in the data holding unit to the data transfer bus.

In the present embodiment, the addressing unit is configured to address a specific processor element, and the data holding unit of the predetermined processor element addressed by the addressing unit carries out either acquiring or outputting data by way of the data transfer bus in response to the signal inputted to the data holding unit from the signal generating unit.

As a result of construction just described, by sending input signals for holding data to be processed, which are held in the data holding unit, from signal generating unit to the data holding unit, the data holding unit serves to acquire and hold the data to be processed. Alternately, by sending output signals for outputting already processed data from signal generating unit to the data holding unit, the data holding unit serves to output the data already processed.

The use of the registers can therefore be made considerably flexible and data processing becomes feasible with the suitably selected combination of registers depending on the bit number of input or output data.

In addition, a plurality of the processor elements in the processor may be formed to be paired such that each of two neighboring, paired processor elements are assigned, respectively, by an odd or even number and that one identical address is assigned to the paired processor elements. A data transfer bus is then assigned to the even-numbered processor elements and another data transfer bus is assigned to the odd-numbered processor elements. Furthermore, the data holding unit in the paired processor elements addressed by the addressing unit can carry out acquiring or outputting data by way of corresponding data transfer bus.

As a result of construction described above, data transfer for both even- and odd-numbered processor elements can be carried out by addressing once a paired processor via corresponding data transfer bus which is respectively assigned to either the even- or odd-numbered processor element.

The transfer is therefore achieved of a larger amount of data by a single transfer addressing, to thereby attain higher speeds in data transfer and resultant data processing.

In another aspect of the embodiment disclosed herein, the SIMD processor may additionally include a predetermined number of data holding units. Utilizing these holding units, processing operation of the data can be carried out by dividing data into predetermined processing units, then acquiring the data by the units from the data holding unit, and processing the data by the divided units.

As a result, data processing becomes feasible for the data with volume exceeding the capacity of data holding units in the processor element.

For example, even when the processing number (i.e., pixel number) on one line increases, it becomes feasible for portions of the data be held in external data holding units such as line buffers. The data can subsequently be divided into a number of processing units to be subsequently inputted and processed in a repeated manner. Therefore, data processing becomes feasible with relative ease for image data with an increased pixel numbers as well.

The following examples are provided to further illustrate preferred embodiments of the SIMD processor disclosed hereien.

Exemplary Embodiment 1

Referring to FIG. 1, an SIMD processor is provided which includes a global processor 2, a plurality of processor element (PE) blocks 3a which exemplified by 256 of these blocks in the present embodiments, an external interface 4 connected to a memory controller 5.

Responding to commands from the global processor 2, the memory controller 5 enables a direct access to data, which is to be presently operated, from a memory 6 to a register file 31 which is located in the processor in use for input/output processing.

As also shown in FIG. 1, the memory controller 5 is connected to the register file 31 in an SIMD type processor 1 by way of a data transfer port of the external interface 4. The memory controller 5 serves to transfer data from register file 31 to memory 6, and vice versa. Being controlled by memory controller 5, a register 31b is mapped into an I/O space and enabled to be either readable or writable with outputting several controls such as address, clock, and read/write.

From the global processor 2 to the memory controller 5, I/O signals are entered by way of a bus, such as address, data, and control signals. The global processor 2 executes various commands related to respective processing steps to be entered into processing setup registers (not shown). In addition, the global processor 2 instructs the memory controller 5 to automatically execute a predetermined set of processing steps through a start code entered into a start register (not shown) of the memory controller 5.

With this configuration, data in the register file 31 can be either inputted or outputted simultaneously with ongoing processing operation implemented by instructions from the processor.

Figure 2:
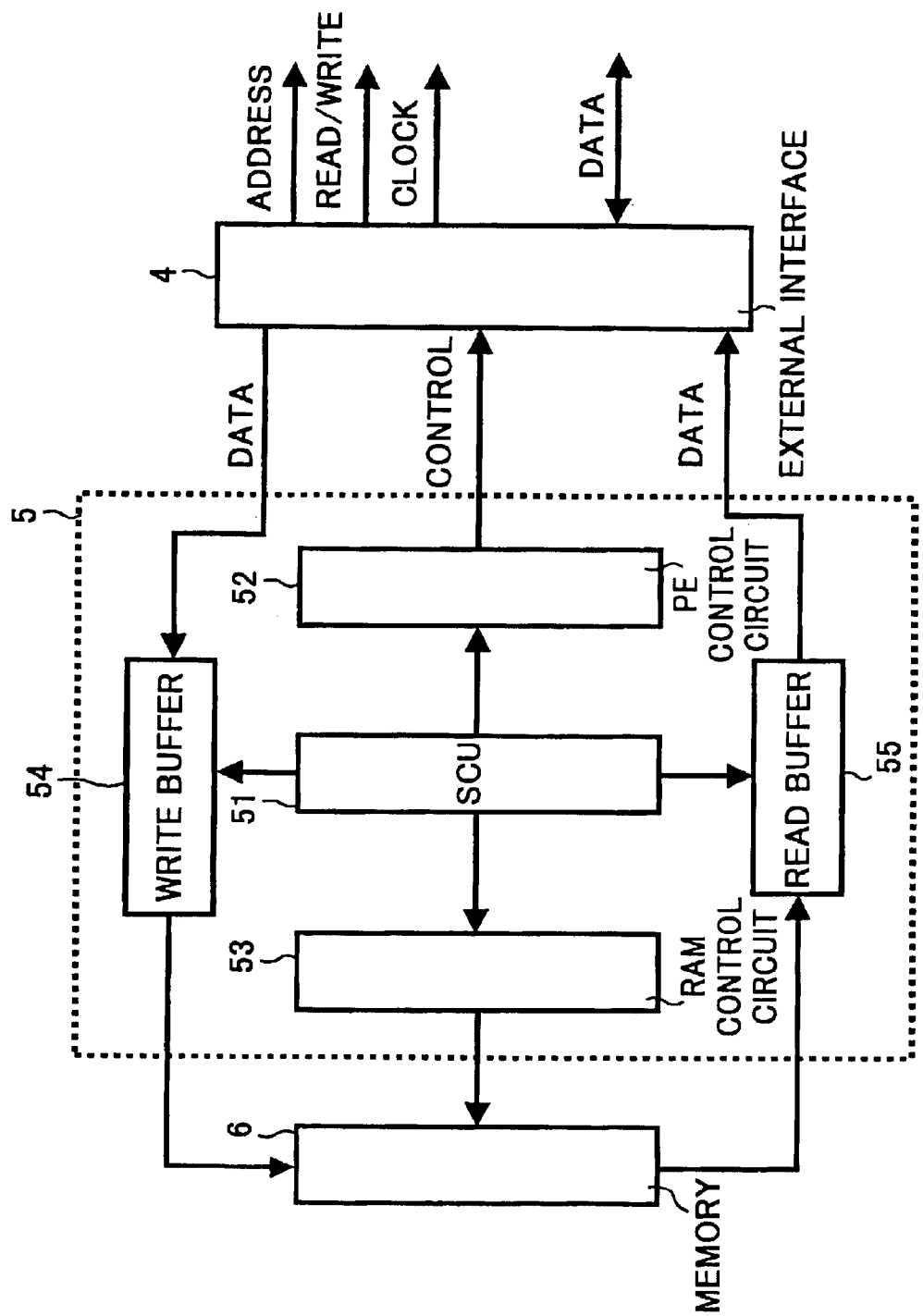
FIG. 2 is a block diagram illustrating one embodiment of the memory controller herein.

FIG. 2 is a block diagram illustrating the operating circuits for the memory controller 5 according to one embodiment disclosed herein. The memory controller 5 includes a write buffer 54 for implementing data write to the memory 6, a read buffer 55 for implementing data read from the memory 6, a PE controller 52 for controlling the PE register file, a RAM controller 53 for controlling the memory 6, and a sequence unit (SCU) 51.

An output port of the external interface 4 of the SIMD processor 1 is connected to the write buffer 54, while an input port is connected to the read buffer 55.

Figure 3:
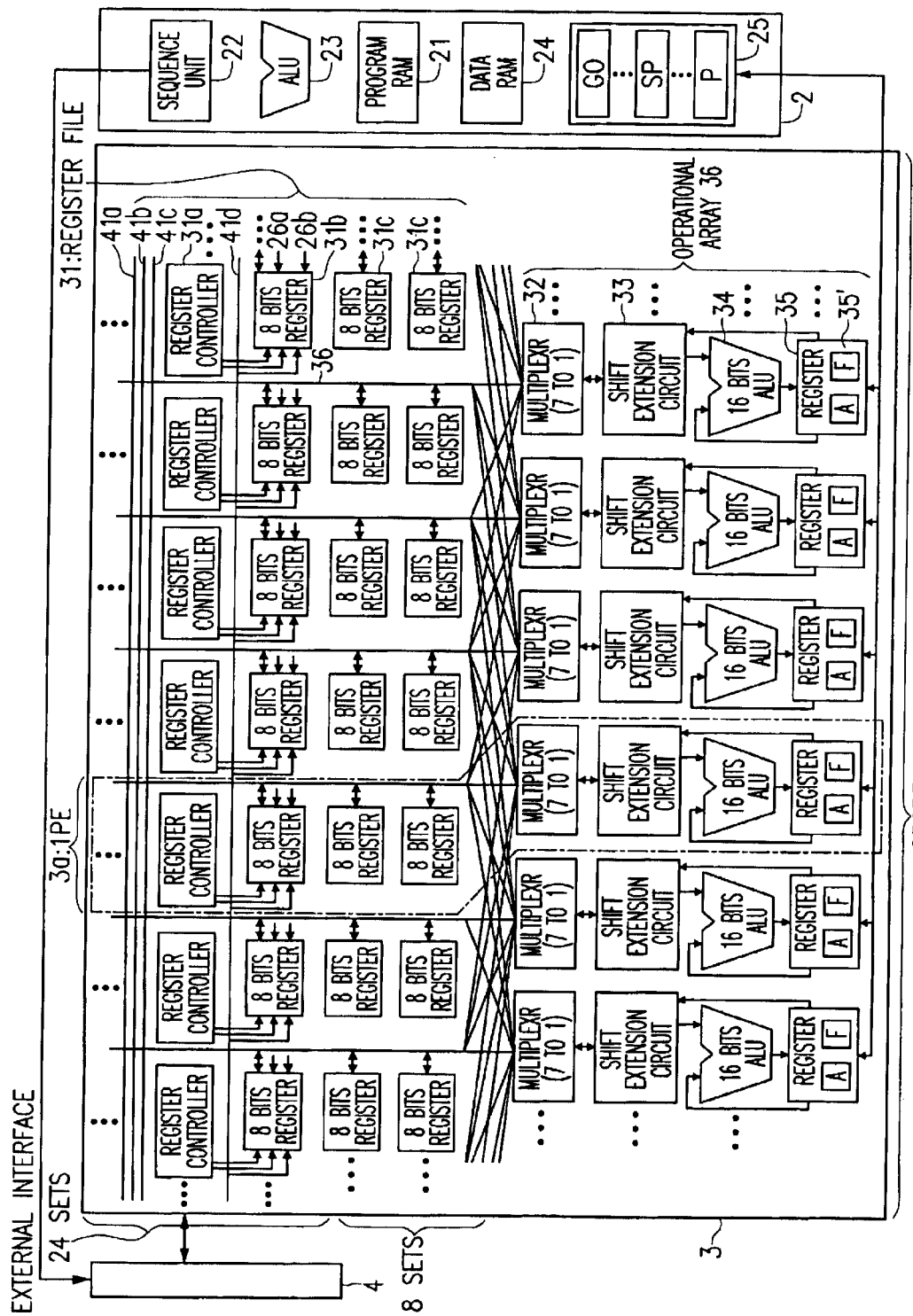
FIG. 3 is a diagram illustrating the circuit construction of the SIMD processor according to one embodiment disclosed herein.

As illustrated in FIG. 3, the global processor 2 contains a program RAM 21 which stores programs for controlling the global processor 2, processor element blocks 3, external interface 4 and memory controller 5; and a sequence unit 22 which controls, according to the instruction from the program RAM 21, the global processor 2, processor element blocks 3, external interface 4 and memory controller 5.

To be more specific, the sequence unit 22 is configured to control an arithmetic and logic unit (ALU) 23 and other similar units provided in the global processor 2. The unit ALU is detailed hereinbelow.

In addition, the sequence unit 22 controls register file 31, which is contained in the processor element blocks 3, and operational arrays 36. These unit, the processor element blocks 3 and operational arrays 36, are also detailed later on. The operational arrays 36 contains a multiplexer 32, a shift extension circuit 34, an ALU 34 and a register 35. It is noted that the global processor 2 is of aforementioned SISD type, which executes one processing step responding to one processing command.

Furthermore, the sequence unit 22 provides the memory controller 5 with processing setting data and commands for transferring data.

The memory controller 5 sends to the external interface 4 according to the processing setting data and commands for transferring data from the sequence unit 22, address control signals for addressing the processor element 3a, read/write signals for instructing read/write processing steps to the register 31b in the processor element 3a, and clock control signals for generating clock signals.

In this context, it is worth to note that write signals of the above read/write signals are used for transferring data being processed from a data bus 41d to be held in the register 31b of register controller 31a. While read signals of the above read/write signals are for instructing register 31b to send processed data to data bus 41d, which are held in the register 31b of register controller 31a.

The memory controller 5, responding to commands from the global processor 2, also generates signals for assigning the address of the processor element 3a contained in the processor element block 3 (hereinafter referred to as addressing commands) to subsequently send them from the external interface 4 to the register controller 31a of the processor element 3a via an address bus 41a.

In addition, the memory controller 5 also sends signals for instructing read/write processing steps (hereinafter referred to as read/write commands) to the register 31b in the processor element 3a, via a read/write signal 41b.

Furthermore, the memory controller 5 sends clock signals to the register controller 31a in the processor element 3a, via a clock signal 41c.

As described earlier, the memory controller 5 also provides to a data bus 41d the data stored in the external memory 6, which are exemplified by 8 bits parallel data in the present embodiment. The format of the just described 8 bits parallel data may suitably be changed depending on the kind of the data.

The data bus 41a is also used for transferring processed data held in the register 31b to the external memory 6 provided exterior to the SIMD type processor 1.

It is noted that, since the memory 6 serves to store both of data being operated as well as already processed, this may alternately be provided interior of the SIMD processor 1. In addition, although the transfer of data between memory controller 5 and memory 6 is described as 8 bits parallel data in the present embodiment, other data formats may suitably be selected depending on the kind of the data. In addition, other processing steps by the memory controller are described hereinbelow.

The global processor 2 contains the ALU 23 for carrying out arithmetic and logic operations according to the instruction from the above sequence unit 22, and data RAM 24 for storing operational data. The global processor 2 also contains a series of registers 25 for holding data to be processed.

The series of the registers 25 include program counter (PC) for holding addresses in the program, versatile registers such as G0–G3 registers for storing operational data, stack pointers (SPs) for holding addresses in shunting RAMs during either shunting or restoring period, ring registers (LSs) for holding call initiating addresses during subroutine calling periods, a link interrupt (LI) register and a link non-maskable interrupt (LN) register for holding jump initiating addresses during interrupt request (IRQ) and non-maskable interrupt request (NMI) periods, and processor status registers (P) for holding status parameters of the processors. In addition, these registers 25 are connected to the registers 35 to exchange data therebetweeen.

As illustrated in FIGS. 1 and 3, processor element block 3 contains a plurality of units or processor elements 3a, each including register file 31, multiplexer 32, shift extension circuit 33, ALU 34 and register 35.

As an exemplary configuration according to the present embodiment, the register file 31 includes, for each processor element unit, 32 of the 8-bits registers to thereby form a register array constituting 256 bits described just above.

The register file 31 therefore includes the plurality of registers such as R0, R1, R2, . . . R31 for each unit of the processor element (PE) 3a with an operational array 36. Each register file 31 is then provided with one read port and one write port, for each of the operational array 36, and can be accessed from this array 36 via an 8-bits read/write bus. Twenty-four of the 32 registers are configured to be accessed from the exterior, thereby for an arbitrary register being capable of executing read/write processing steps in response to externally inputted clock and read/write controls.

The 32 registers are also configured to have external access to a register in any of the processor elements through an external port by addressing the number of that processor element (i.e., one of 0 through 255). Therefore, the number of the external port for the external access, amounts to 24. In addition, the external access to the register is configured to form 16-bits data by pairing an even-numbered processor element with an odd-numbered, to thereby be accessed simultaneously to two registers by a single access step.

The number of the processor element 3a is describe above as 256 in the present embodiment. However, the number is not limited to that value and may suitably be selected depending on the kind of the data and circuit configuration.

In addition, the above-mentioned addressing the number (0 through 255) is carried out by the instruction of the sequence unit 22 of global processor 2, starting with the number 0 for the register nearest to the external interface 4, and so on.

The register file 31 in the processor element 3a is provided with the register controller 31a and two kinds of registers 31b and 31c. In the present embodiment, there are included in every unit of the processor element 3a, 24 pairs consisting of register controller 31a and register 31b, with additional 8 registers 31c.

Figure 4:
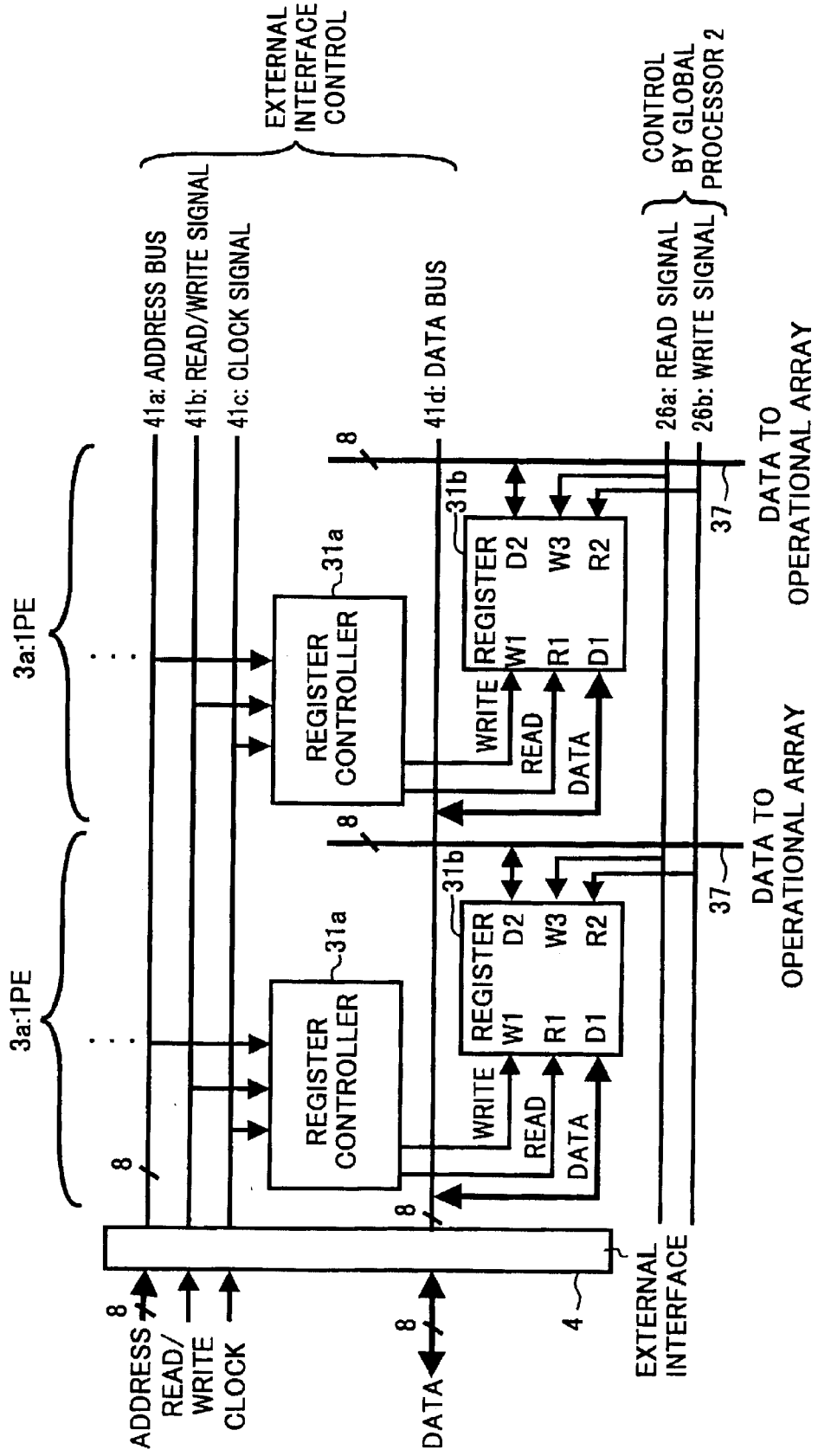
FIG. 4 is a diagram illustrating the construction of the processor element according to one embodiment disclosed herein.

Among the plurality of the registers, only portions of those included in two of the processor elements 3a are shown in FIG. 4. The notation 1PE represents herein one processor element 3a. In addition, although the registers 31b and 31c are described to be 8-bits in the present embodiment, other bit numbers may suitably be selected depending on the kind of the data.

As illustrated in FIG. 4, the register controller 31a is connected to the external interface 4, via address bus 41a, read/write signal 41b, and clock signal 41c.

Responding to address setting signals which are sent via an address bus 41a from the memory controller 5 to the external interface 4, the register controller 31a decodes the address setting signals. When the decoded address setting signal is found in coincidence with the previously inputted address signals, the register controller 31a acquires read/write commands from the memory controller 5 via read/write signal 41b in synchronous with the clock signals which are sent from memory controller 5 via clock signal 41c. These read/write commands are subsequently transferred to the register 31b.

The register 31b is capable of either holding data, which is externally inputted to be processed by the ALU 34, or outputting data processed by the ALU 34. Namely, the register 31b is configured to be able to serve as either an input or an output register. In addition, it also serves as a temporary storage of the data either to be processed or already processed, such as register 31c which is detailed later. Although the data bit in the register 31b is described as 8 bits in the present embodiment, other data formats may suitably be selected depending on the kind of the data.

When write commands are received from the register controller 31a, the register 31b acquires and holds data to be processed via a data bus 41d. In contrast, when read commands are received from the register controller 31a, the register 31b outputs data, which are already processed and then held therein, to the data bus 41d. Subsequently, these data are transferred through the external interface 4 to a write buffer 54 of the memory controller 5 to be stored in the memory 6.

In addition, the register 31b is connected to a multiplexer 32 by way of the data bus 41d which is capable of transferring 8 bits parallel data. As indicated earlier, the register 31b is configured to serve as either an input or an output register. That is, the data either to be processed or already processed by the ALU 34 can be transferred to the register 31b via the data bus 36.

This data transfer is carried out, according to the commands sent from the sequence unit 22 of the global processor 2 by way of read signal 26a and write signal 26b, which are both connected to the global processor 2. Namely, when read commands are received from the sequence unit 22 of the global processor 2 via read signal 26a, the register 31b acquires and holds the data which are processed by the ALU 34 and transferred via the data bus 36. In contrast, when write commands are received from the sequence unit 22 of the global processor 2 via write signal 26b, the register 31b outputs, to the data bus 36, the data which are already processed and then held therein. These data are transferred to the ALU 34 to be processed subsequently.

The register 31c is configured to temporarily hold before the data which are to be processed be transferred from, or the data already processed be transferred to the register 31b. Unlike the register 31b, the register 31c does not operate in a manner described earlier, in which data transfers are made between the memory 6 through the memory controller 5.

The operational array 36 includes the multiplexer 32, shift extension circuit 33, 16-bits ALU 34, and 18-bits register 35 which further contains 16-bits A and F registers.

The processing step executed by the commands from the processor element 3a is primarily carried out by inputting the data readout from the register file 31 into one of two inputs of the ALU 34, inputting the content in the A register of the register 35 into the other of the two inputs of the ALU 34, and subsequently storing the processed results into the A register. The processing is therefore carried out between A register and R0~R31 registers in the register file 31.

A (7 to 1)-multiplexer 32 is provided herein to connect the register file 31 to the operational array 36, so as to select the data to be processed from seven processor elements 3a. That is, there selected are three neighboring processor elements toward the left, three toward the right, from the column of the multiplexer, and one in the middle column of the processor element (FIG. 3). In addition, 8-bits data in the register file 31 are shifted by arbitrary bits toward left by the shift extension circuit 33, to subsequently inputted into the AUL 34.

Furthermore, the valid/invalid control for the processing is carried out for respective processor elements 3a by 8-bits conditional registers T (not shown). As a result, the selection of one processor element 3a becomes feasible to access the one for respective processing steps among the plurality of the processor elements.

As indicated above, the multiplexer 32 is connected not only to a data bus 36 of the processor element 3a located in its own column but also to six data buses 36 of the neighboring processor elements 3a on both left and right sides of the column.

The multiplexer 32 can therefore be able to select one processor element 3a out of the seven and send the data which are held in the registers 31b and 31c to the ALU 34. Alternately, the multiplexer 32 sends the data, which are already processed by the ALU 34 to the registers 31b and 31c in the selected processor element 3a.

With this configuration including the multiplexer, the processing data which are stored the registers 31b and 31c of processor elements 3a in the neighboring column, becomes feasible. The processing capability of the SIMD type processor is therefore increased.

The shift extension circuit 33 serves to shift the data sent from the ALU 34 by a predetermined bits to subsequently send to ALU 34. Alternately, the shift extension circuit 33 shifts the processed data sent from the ALU 34 by a predetermined bits to subsequently send to multiplexer 32.

The ALU 34 serves to carry out arithmetic and logic operations according to the both data, ones sent from the shift extension circuit 33 and the others held in the register 35.

Although the data bit for the ALU 34 is so far described as 16 bits in the present embodiment, other data formats may suitably be selected depending on the kind of the data.

The data subjected to the arithmetic and logic operations are subsequently held in the register 35 to be transferred either to the shift extension circuit 33 or to the general purpose register 25.

Referring now to FIG. 4, the methods are detailed to access externally to the register file 31 of the processor element 3a. There included in the FIG. 4 are a plurality of external ports of the external interface 4, provided with an 8-bits address, a read/write signal for addressing either read or write processing steps at its high or low level, respectively, a clock for timing data transfer, and an 8-bits data for transfer.

These signals are transferred to the external interface 4 to be subjected to either timing or buffering, and subsequently transformed to a plurality of internal signals such as address, read/write, clock and data.

Although these signals are sent to respective registers of the register file 31, the read/write processing step is executed to only one of the registers, the address of which is in coincidence with the address which is presently obtained after decoding the above address signals for corresponding processor elements 3a. Accordingly, a register controller 31a is herein provided for decoding the address signals for respective processor elements 3a and for controlling the read/write processing step. In addition, responding to read/write commands (i.e., W1 for write and R1 for read) entered via the read/write signal 41, the I/O register 31b executes the data transfer via the data bus 41d connected to the external interface 4.

Since the I/O register 31b carries out data transfer between the operational array 36 as well, this register 31b is provided with the other I/O port. The data transfer is thus achieved between the register 31b via a data bus 37 (D2), responding to another set of control signals for write (W2) and read (R2), which are generated by the global processor 2 and transferred via read signal 26a and write signal 26b, respectively.

Although two sets of the register files 31 in conjunction with the processor element 3a are shown in FIG. 4, 256 sets of them are provided in the embodiment disclosed herein, including the register files 31 and processor elements 3a. In addition, in order to select among the 256 sets, an address of 8-bits width is necessary. This indicates that the address bit width may vary depending upon the number of the processor elements 3a. Although the data bit is described herein as 8 bits in the present embodiment, it may suitably selected depending on the amount of data transferred at one time.

Being configured as described hereinabove, the SIMD processor 1 disclosed herein has a variety of processing capabilities to thereby provide numerous advantages, which follow.

When the data stored in memory 6 are intended to be transferred to certain processor elements 3a, this transfer is achieved by entering only once a clock signal assigned to those processor elements 3a. For example, when data are to be transferred only to even-numbered processor elements 3a, a clock signals for those elements are enough to be addressed. Since no data transfer is made necessary to other add-numbered processor elements 3a during the transfer, the data transfer can be achieved at higher speeds, to thereby facilitate to achieve higher data processing with the SIMD processor 1 disclosed herein.

In contrast, when processed data held in the register 31b are intended to be transferred to the memory 6, this data transfer can be achieved by being selected an address assigned to a certain processor element 3a by the memory controller 5, then entering only one clock signal. In this case also, data transfer can be achieved at higher speeds, to thereby facilitates higher data processing as well.

As indicated earlier, there are included 24 registers 31b in every unit of the processor element 3a in the present embodiment, and they are each capable of either holding data which is either externally inputted to be processed or outputting processed data. That is, the registers 31b each serves as an input register and an output register as well.

As an exemplary case, a processing application is assumed, in which the data transferred from the memory controller 5 to the processor element 3a (i.e., input data) are of 56 bits, the data transferred from the processor element 3a to the memory controller (i.e., output data) are of 32 bits, and the data temporarily held are of 80 bits. In such a case, the registers are available with seven of the registers 31b as the ones for holding 56-bits input data (8 bits×7=56 bits), and four of the registers 31b as the ones for holding 32-bits output data (8 bits×4=32 bits).

As exemplified just above, processing operation is feasible as long as the total number of the input and out data bits do not exceed 8 bits×24=192 bits.

As indicated earlier, 8 registers 31c are included in every unit of the processor element 3a in the present embodiment. The data can be therefore held therein up to 8 bits×8=64 bits. However, for the temporarily held data of 80 bits, as exemplified just above, the registers 31c alone are short by 16 bits (=80 bits−64 bits). In such a case, since the register files 31 are capable of temporarily holding data, two (8 bits×2=16 bits) of the still unused 11 (=24−7−4) of the registers 31b can be utilized for temporarily holding the data.

Since the registers 31c are thus considerably flexible in use for the processing, the method of arbitrarily combining registers, for example, is suitably selected depending on the bits of the data to be processed. This facilitates to broaden the range of applications feasible by the SIMD processor, which is advantageous over known similar processors.

Figure 5:
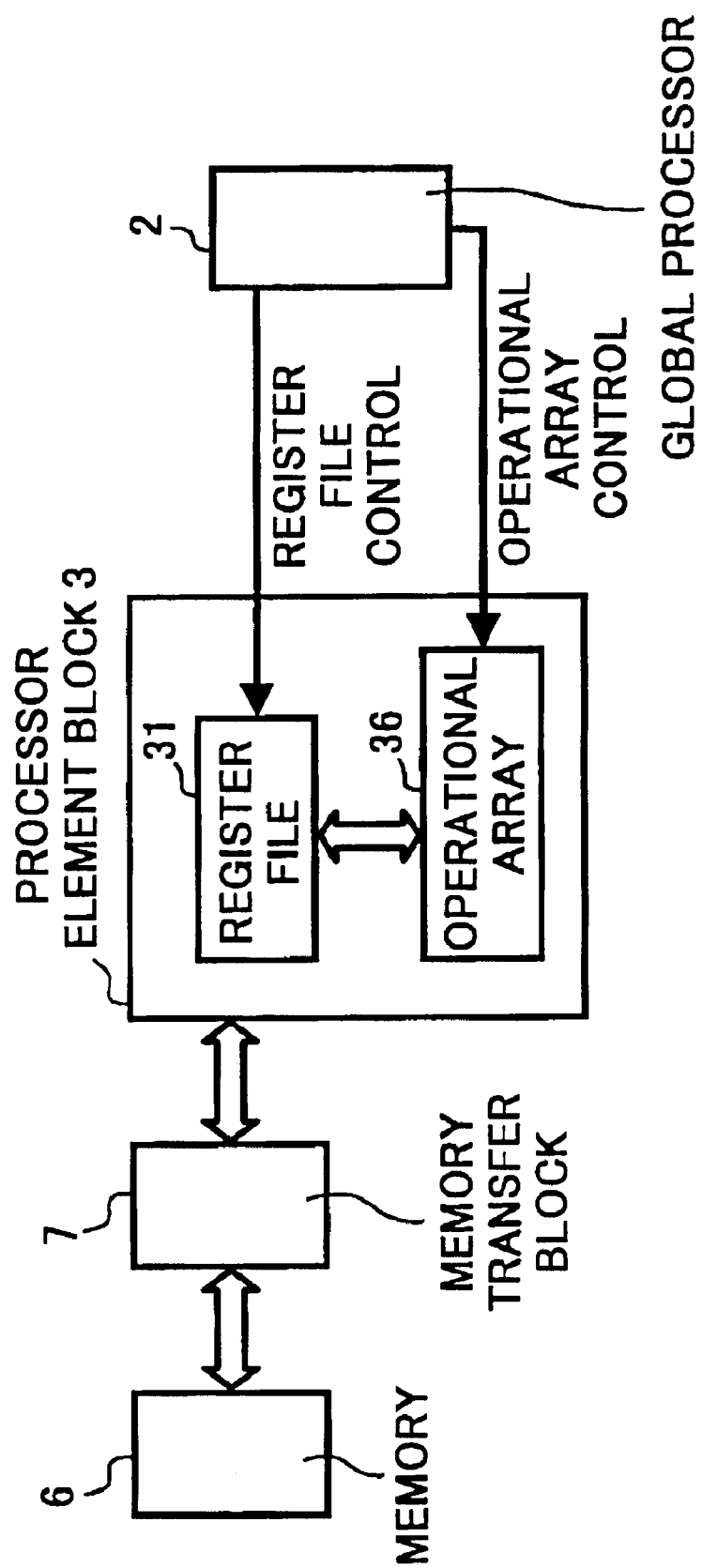
FIG. 5 is a block diagram illustrating one embodiment of the processor disclosed herein, in which both a memory for the data be forwarded and a memory transfer block are provided on a single chip.

Although the external ports of the external interface 4 are described as outside terminals, other forms of the ports may also be suitably employed. Namely, the selection of an arbitrary register is feasible by decoding an address setting signal and controlling read/write step with respect the unit of the processor elements 3a shown in FIG. 3 and by having access to one of the processor elements 3a through the memory transfer block 7 on that chip. This is achieved even in the case where both the memory 6 for the data be forwarded and a memory transfer block 7 are provided on a single chip, particularly without outside terminals, as illustrated in FIG. 5.

Figure 6B:
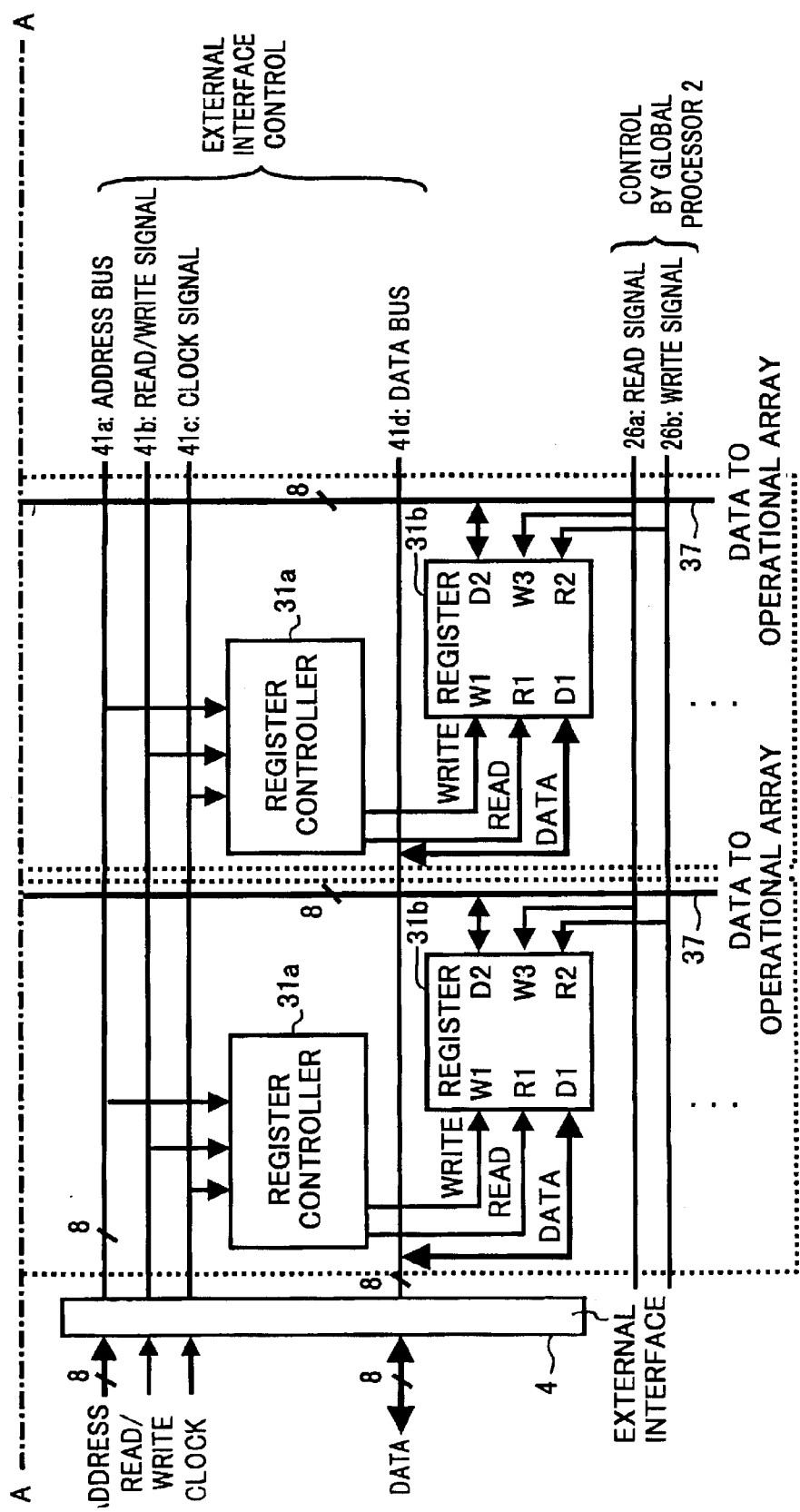
FIG. 6 is a diagram illustrating a modification to the embodiment shown in FIG. 4.

Referring now to FIG. 6, a modification of the above embodiment will be described. In the configuration of FIG. 6, there are provided two of the fundamental structures of FIG. 4. Since 24 of the I/O registers 31b are provided, and additional 8 of registers 31c are operational registers 31c which are accessible only from the operational array 36, as described earlier referring to FIG. 3, the following processing operation becomes feasible with the configuration of FIG. 6.

For example, an application is assumed, in which input data are of 56 bits, output data are of 32 bits, and data temporarily held are of 80 bits. In such a case, the registers are available so as to include seven of the registers 31b as external input registers and four of the registers 31b as external output registers. In addition, additional registers up to 10 become available with the configuration of FIG. 6, which are consisted of eight operational registers 31c and two I/O registers 31b for temporarily holding the data.

Therefore, data processing becomes feasible with flexible use of arbitrary combinations of the register as long as the total number of the input and out data bits does not exceed 192 bits and the total number further including temporarily held data does not exceed 256 bits.

It should be noted that the present configuration is advantageous over previously known constructions, since the latter are not capable of operating the data, the bit width of which exceeds at least one of the fixed bit widths, because of their fixed bit widths of input, output, and operational registers.

Exemplary Embodiment 2

Figure 7:
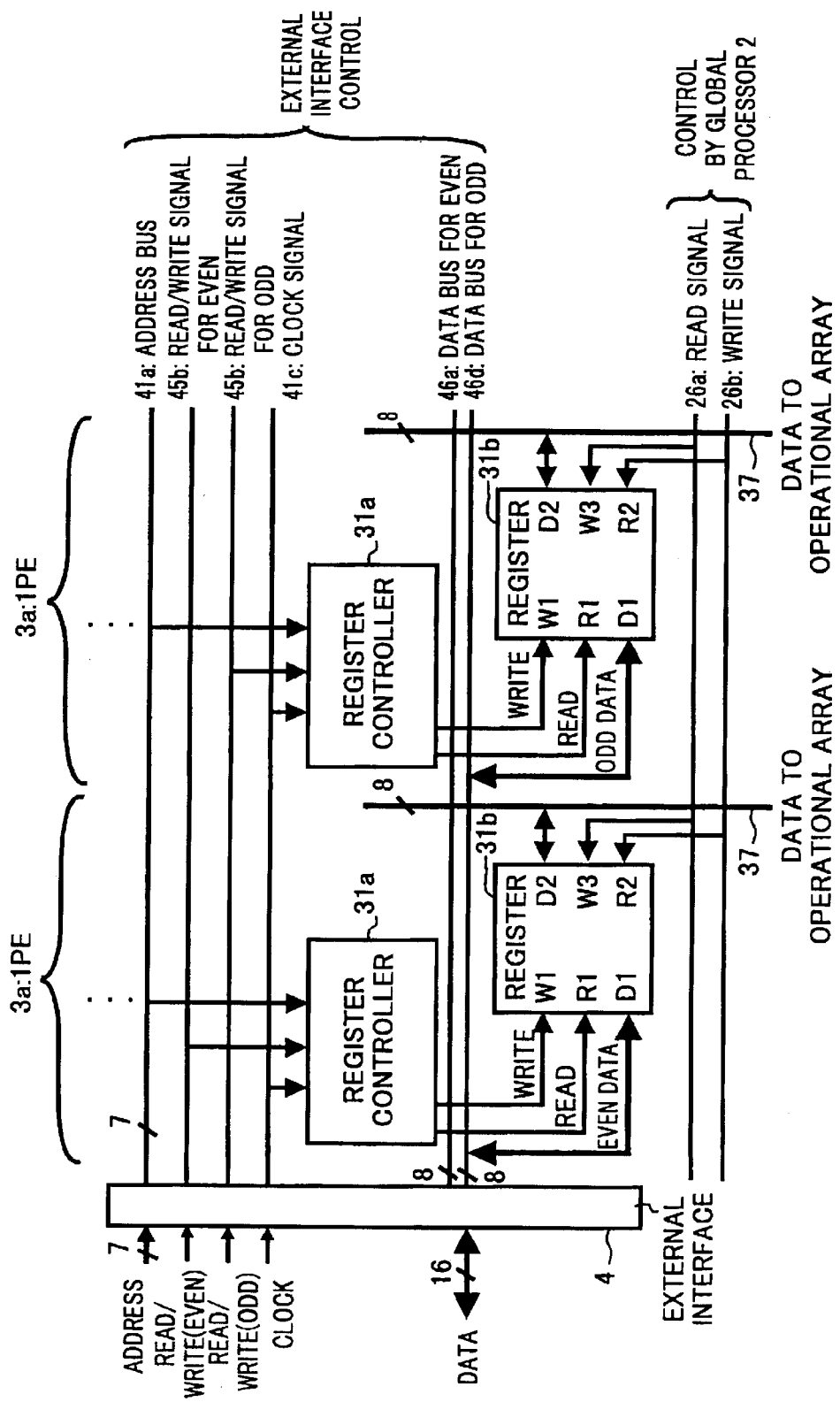
FIG. 7 is a diagram illustrating the circuit construction of the processor elements according to another embodiment disclosed herein.

Another illustrative embodiment of the SIMD processor 1 is detailed hereinbelow, referring to FIG. 7, wherein components similar to those in FIG. 1 are shown with identical numerical designations, unless otherwise indicated. To simplify the ensuing description of the processor, descriptions similar to those in the embodiment 1 are abbreviated.

The SIMD processor disclosed herein is characterized by pairing the processor elements 3a such that each of two neighboring processor elements are assigned, respectively, by an odd or even number and that one identical address is assigned to the paired processor elements.

The SIMD processor is also characterized by the configuration, in which a data bus 46a connecting the even-numbered processor elements 3a (or data bus for even elements) and another data bus 46b connecting the odd-numbered processor elements 3a (or data bus for odd elements) are also assigned to respective pairs of the processor elements 3a.

In addition, the SIMD processor is further characterized by an additional feature, in that data transfer between the memory controller 5 and the memory 6 provided outside of the SIMD processor 1 is carried out not by 8 bits as in the first embodiment but by 16 bits in parallel. These 16 bits include two 8-bits allocated, respectively, to the even-numbered and odd-numbered processor elements 3a.

The embodiment of the SIMD processor having the above noted characteristics will be detailed hereinbelow.

From the global processor 2 to memory controller 5, I/O commands such as for address, data, and control are entered via bus lines. The global processor 2 sends operational and other similar signals to operation instructing registers (not shown). In addition, responding to a start code entered into start registers (not shown) by the global processor 2, memory controller 5 initiates automatically executing a predetermined set of processing steps.

On receiving an address control command from the memory controller 5, the external interface 4 transfers this command to processor element 3a via the address bus 41a, to thereby addressing is attained to a pair of the processor elements 3a, that is, to two processor elements 3a simultaneously.

The register controller 31a subsequently decodes the address setting signals. When the decoded address setting signal is found in coincidence with the previously inputted address signals, the register controller 31a acquires read/write commands sent from the memory controller 5 via read/write signal 41a or 41b in synchronous with the clock signals sent via clock signal 41c. To be more specific, the even-numbered register controller 31a acquires read/write commands sent from the memory controller 4 via read/write signal 41a for the even-numbered, while the odd-numbered register controller 31a acquires read/write commands via read/write signal 41b for the odd-numbered.

In this step, the read/write commands which are received by each constituent of the paired processor elements 3a, may be different from each other. That is, when the command sent to the even-numbered register controller 31a is a read command, one sent to the odd-numbered register controller 31a may be a write command. These read/write signals 41 are subsequently transferred to the register 31b.

When the write commands are received by both of constituents of the paired processor elements 3a, the registers 31b of the even-numbered processor elements 3a acquire processed data (8-bits) via the data bus for even 46a and hold these data, while the registers 31b of the odd-numbered processor elements 3a acquire the data via the data bus for odd 46b and hold them.

In contrast, when the read commands are received by both of the constituents of the paired processor elements 3a, the registers 31b of the even-numbered processor elements 3a output processed data (8-bits) to the data bus for even 46a, while the registers 31b of the odd-numbered processor elements 3a output processed data (8-bits) to the data bus for odd 46b.

As described just above, by entering an address only once, data transfer is achieved to even-numbered processor elements 3a, as well as to odd-numbered processor elements 3a. The number of times of the data transfer, therefore, can be reduced, to thereby facilitates to increase the speed of data transfer and resultant data processing.

In addition, by having addressed processor elements 3a as in the first embodiment, similar advantages to those for the first embodiment can be achieved in the present embodiment as well.

Figure 8A:
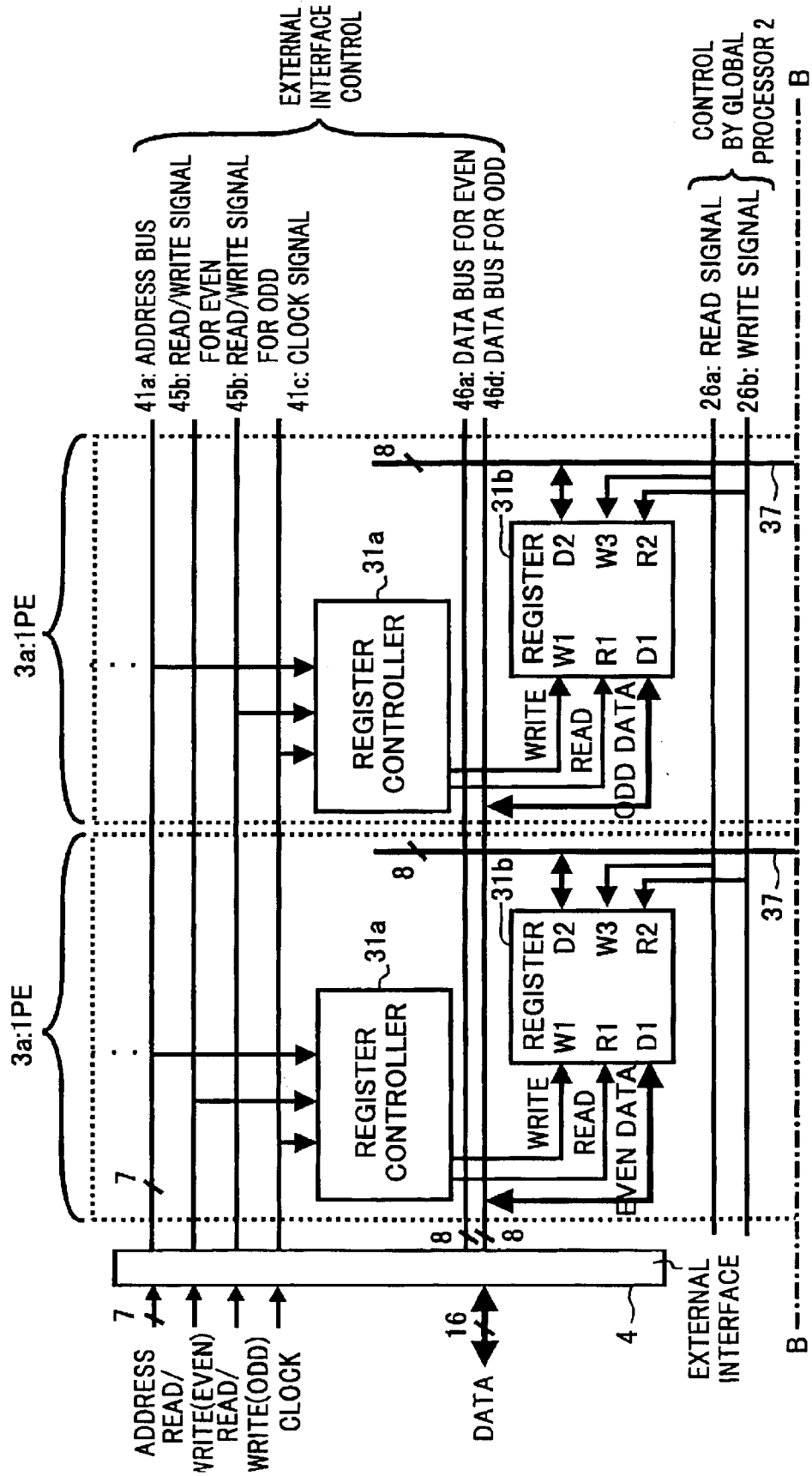
FIG. 8 is a diagram illustrating a modification to the embodiment shown in FIG. 7.
Figure 8B:
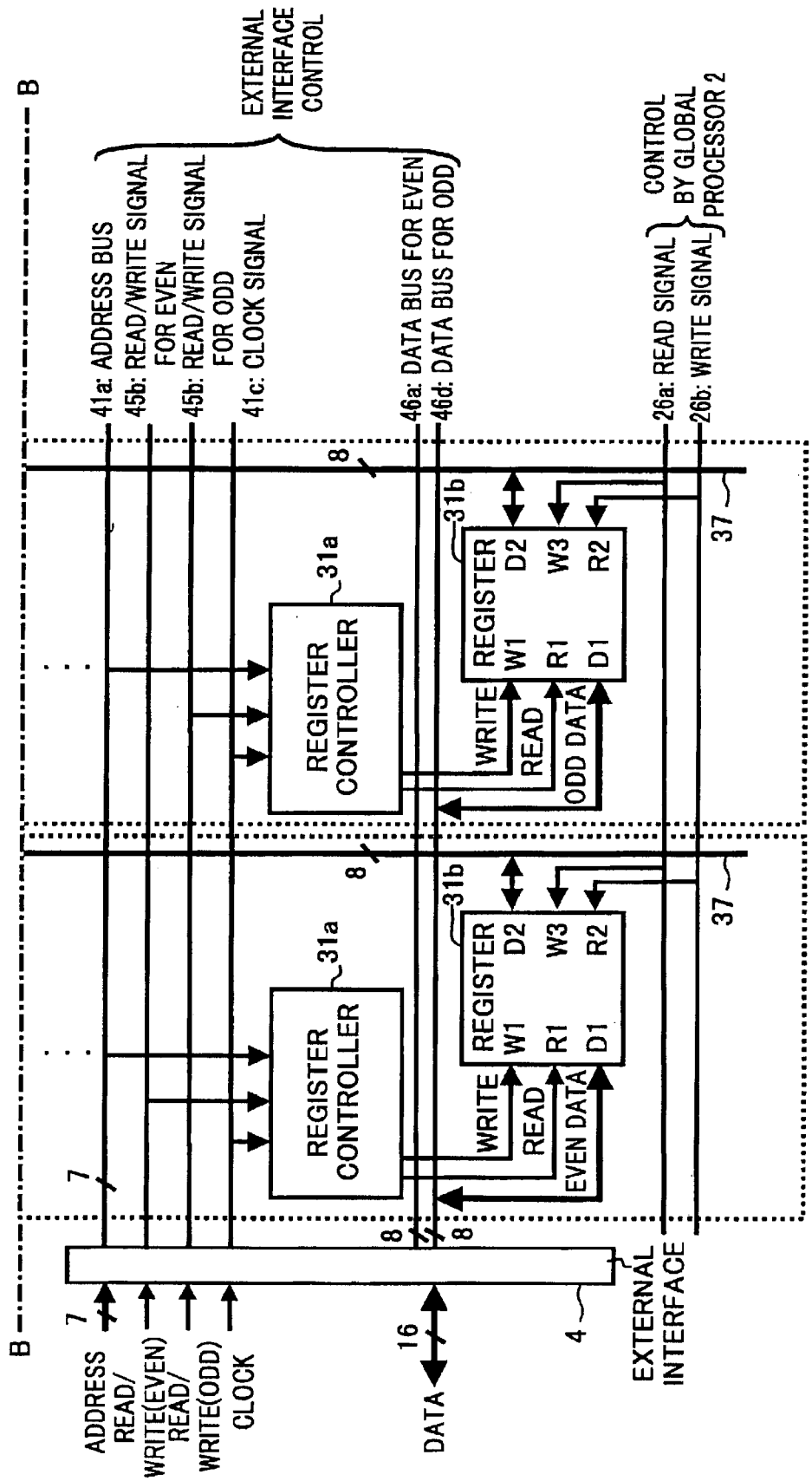

Referring now to FIG. 8, a modification of the above stated embodiment will be described. In the configuration of FIG. 8, there are provided two of the fundamental structures of FIG. 7. Since 24 of the I/O registers 31b are provided, and additional 8 of registers 31c are operational registers 31c which are accessible only from the operational array 36, as described earlier referring to FIG. 3, the following processing steps become feasible with the configuration of FIG. 8.

For example, a processing application is assumed, in which input data are of 56 bits, output data are of 32 bits, and data temporarily held are of 80 bits. In such a case, the registers are available so as to include seven of the registers 31b as external input registers and four of the registers 31b as external output registers. In addition, additional registers up to 10 become available with the configuration of FIG. 8, which are consisted of eight operational registers 31c and two I/O registers 31b for temporarily holding the data.

Therefore, data processing becomes feasible with flexible use of arbitrary combinations of the register as long as the total number of the input and out data bits does not exceed 192 bits and the total number further including temporarily held data does not exceed 256 bits.

Exemplary Embodiment 3

Figure 9A:
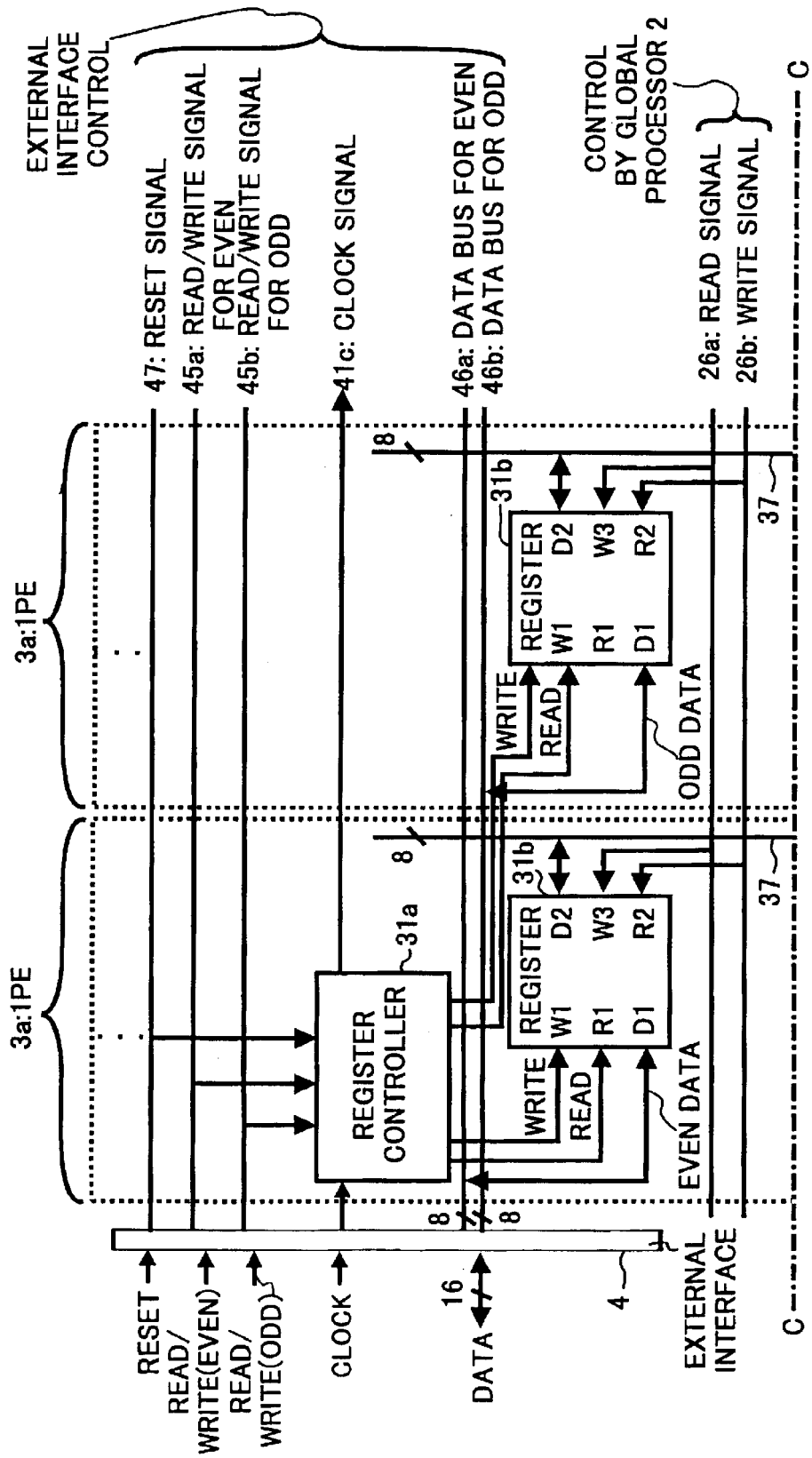
FIG. 9 is a diagram illustrating the circuit construction of the processor elements according to still another embodiment disclosed herein.
Figure 9B:
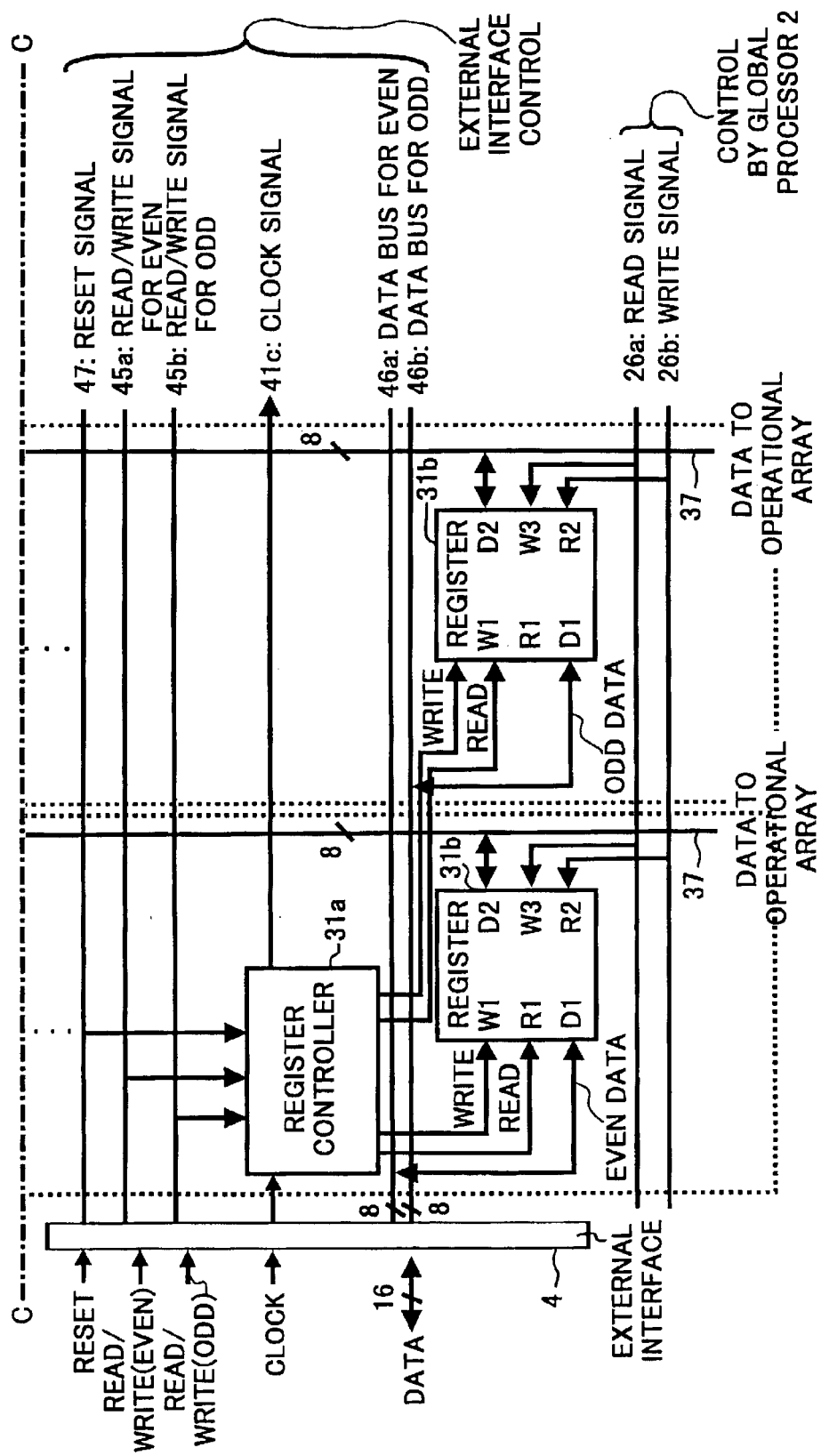

Another illustrative embodiment of the SIMD processor 1 is described hereinbelow, referring to FIG. 9. The method of pointer addressing, or serial memory access method, is utilized in the present embodiment in contrast to the addressing method utilized in the second embodiment.

To simplify the ensuing description of the processor, descriptions similar to those in the embodiment 2 are abbreviated. In addition, components in FIG. 9 similar to those in the embodiment 2 are shown with identical numerical designations.

From the global processor 2 to memory controller 5, I/O commands such as for address, data, and control are entered via bus lines. The global processor 2 sends operational and other similar signals to processing instructing registers (not shown). In addition, responding to a start code entered into start registers (not shown) by the global processor 2, memory controller 5 initiates automatically executing a predetermined set of processing steps.

Responding to commands from the global processor 2, the memory controller 5 generates reset signals which are sent through the external interface 4 to a processor element block 3a. Register controllers 31a are then reset by these reset signals. In addition, a clock signal is sent to the register controller 31a nearest to the external interface 4 from a memory controller 5 thorough the external interface 4 via the clock signal 41c.

In synchronous with the clock signals sent via clock signal 41c, the register controller 31a acquires read/write commands sent from the memory controller 5 via read/write signal 45a or 45b. These read/write commands are then entered to the registers 31b of the even-numbered and odd-numbered processor elements 3a. In this step, the read/write commands which are sent to each constituent of the paired register controllers 31a of the processor elements 3a, may be different from each other in a similar manner to the first embodiment.

Therefore, by entering an pointer address once, data transfer is achieved to even-numbered processor elements 3a, as well as to odd-numbered processor elements 3a, also in a similar manner to the first embodiment. The number of times of the data transfer can be thus reduced to thereby facilitates to increase the speed of data transfer and data processing.

Exemplary Embodiment 4

Another illustrative embodiment of the SIMD processor 1 is described hereinbelow, referring to FIGS. 10 and 11. To simplify the ensuing description of the processor, descriptions similar to those in the embodiment 1 are abbreviated. In addition, the components in FIGS. 10 and 11 also similar to those in the embodiment 1 are shown with identical numerical designations.

Figure 10:
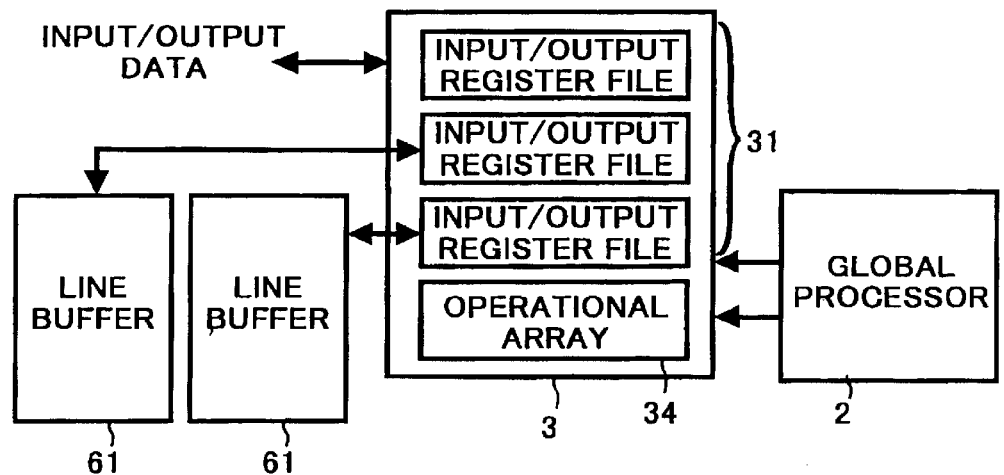
FIG. 10 is a block diagram illustrating the interconnection of the line buffers according to another embodiment disclosed herein.
Figure 11:
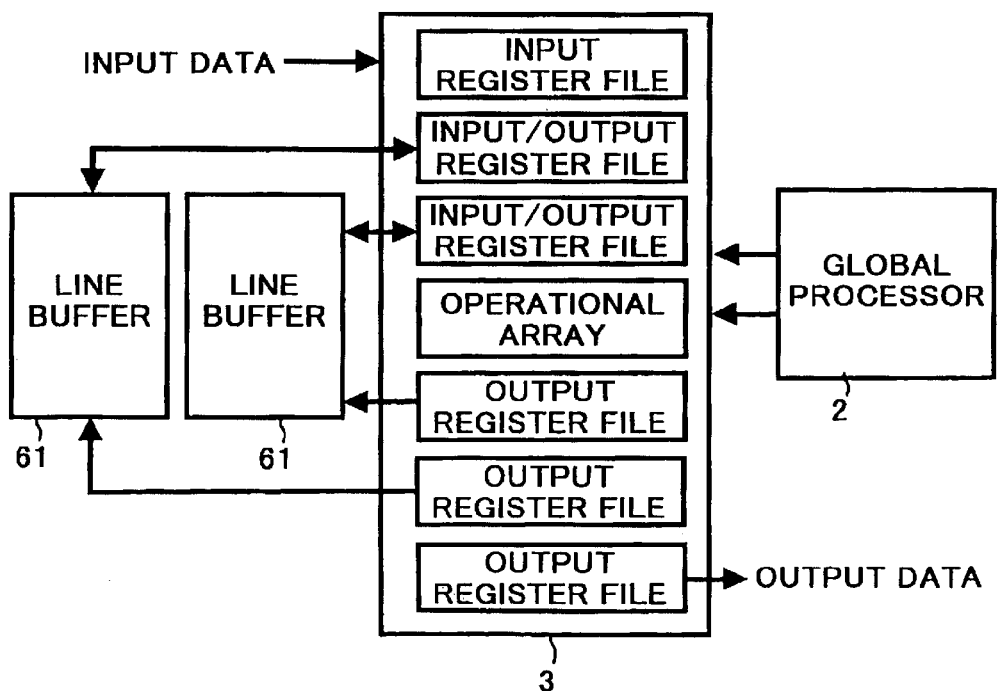
FIG. 11 is a block diagram illustrating a modification to the embodiment shown in FIG. 10.

Referring now to FIG. 10, the SIMD processor disclosed herein is characterized by further providing externally a plurality of line buffers 61. Although two line buffers are shown in FIG. 10, the number thereof may suitably be changed.

These line buffers 61 serve to store several data such as, already processed or necessary to address a picture element either one line above or below the currently addressed pixel. The line buffers 61 also store the data of pixels, the number of which exceeds that of processor elements 3a, as in the case where the pixel number is considerably large.

In the configuration illustrated in FIG. 10, a line buffer 61 is connected to an I/O register file 31, and a portion of the data, which are held in the register file 31, are sent to the line buffer 61 to subsequently be stored. The data stored in a line buffer 61 may be sent to an I/O register 31, where relevant, to subsequently be used for data processing.

It may be added that each of the I/O register blocks of FIG. 10 designates one of 256 combinations of register file 31 and register 31b, aligning as shown in FIG. 3.

As indicated earlier, it is possible for the processor including 256 processor elements 3a to store data of up to 256 pixels into internal register files 31. When the number of pixels exceeds that number, data of one line can be divided to be subsequently stored.

In such a case, by utilizing the plurality of line buffers 61 provided externally, a method of data processing becomes feasible, in which, even when the number of pixels exceeds 256, the data are first acquired by the unit of 256 pixels, then can be processed repeatedly, to thereby facilitate to efficiently process data of as many pixels as possible. The extent of the pixel number, however, is limited by the capacity of the line buffer 61.

Therefore, the data processing can be carried out with relative ease with the additionally provided line buffers 61, even when the number of pixels is considerably increased.

In addition, it also becomes feasible for portions of the data in I/O register files 31 be stored in line buffers 61. As a result, some vacant I/O register files 31 are provided to become available for other possible data processing, to thereby be able to carry out processing more efficiently. That is, data processing becomes feasible for the data with a capacity exceeding that of registers 31b in processor element 3a.

Furthermore, an external line buffer 61 is additionally provided regardless of the kind of the register file. That is, as illustrated in FIG. 11, a line buffer 61 may be provided to be connected to an input register file for only storing data to be processed, as well as, to an output register file for only outputting processed data to a data bus 41d.

In these cases, portions of the data stored in the output register file are sent to a line buffer 61 to be subsequently be held. The data held in the line buffer 61 are sent to an input register to subsequently be used as the data to be processed.

It is apparent from the above description including the examples, since the data to be processed can be held directly in a specific data holding unit in an addressed processor element with the present structure of the processor, the data can be transferred directly to the specific processor element. Likewise, processed data can be outputted from a specific data holding unit of the addressed processor element. As a result, higher speeds are achieved of data transfer and resultant data processing.

In addition, the data holding unit serves as input as well as output registers. The use of the registers can therefore be made more flexible and data processing becomes feasible with the suitably selected combination of registers depending on the bit number of input or output data.

Furthermore, data transfer for both even- and odd-numbered processor elements can be carried out by addressing once a paired processor via respective data transfer buses which are respectively assigned to the even- or odd-numbered processor elements. The transfer is therefore achieved of more data for a single transfer addressing, to thereby attain higher speeds of data transfer and resultant data processing.

The processor disclosed herein may additionally include a predetermined number of data holding units. Utilizing these holding units, processing operation of the data can be carried out by dividing data into predetermined processing units, to be inputted and processed by the divided units in a repeated manner. Therefore, data processing becomes feasible with relative ease for increased number of repeated processing.

Additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 11-286865, filed with the Japanese Patent Office on Sep. 10, 1999, the entire contents of which are hereby incorporated by reference.

What is claimed as new and desired to be secured by Letters Patent of the United States is:

1. A single instruction stream multiple data stream (SIMD) processor comprising:

a plurality of processor elements each having,
a processing unit for processing data, and
a data holding unit for holding any of data to be processed and already processed by said processing unit;

a data transfer bus interconnecting said processor elements; and an addressing unit for addressing any one of said processor elements, wherein said data holding unit of a specific processor element addressed by said addressing unit carries out any one of acquiring and outputting data by way of said data transfer bus.

2. The SIMD processor according to claim 1, wherein said data holding unit comprises a first data holding unit for holding data to be processed, and a second data holding unit for holding data already processed by said processing unit.

3. The SIMD processor according to claim 1, wherein:

said plurality of processor elements are formed to be paired such that each of two neighboring processor elements are assigned, respectively, by an odd or even number and that one identical address is assigned to the paired processor elements;

a data transfer bus is assigned to the even-numbered processor elements and another data transfer bus is assigned to the odd-numbered processor elements; and said data holding unit in said paired processor elements addressed by said addressing unit carries out any one of acquiring and outputting data by way of one corresponding data transfer bus.

4. The SIMD processor according to claim 1, wherein each of said plurality of processor elements includes a predetermined number of data holding units.

5. The SIMD processor according to claim 4, wherein processing operation of data in each processor element is carried out by dividing data into predetermined units, acquiring the data from said data holding unit by, and processing data in said predetermined units by the processing unit.

6. A SIMD processor comprising:

a plurality of processor elements each having,
a processing unit for processing data, and
a data holding unit for holding any of data to be processed and already processed by said processing unit;

a data transfer bus interconnecting said processor elements;

an addressing unit for addressing any one of said processor elements; and a signal generating unit for inputting to said data holding unit any of input signals for acquiring data to be processed from said data transfer bus to subsequently hold the data in said data holding unit and output signals for outputting processed data held in said data holding unit to said data transfer bus, wherein said addressing unit addresses a specific processor element, and said data holding unit of said specific processor element addressed by said addressing unit carries out any one of acquiring and outputting data by way of said data transfer bus in response to the signal inputted to said data holding unit from said signal generating unit.

7. The SIMD processor according to claim 6, wherein:

said plurality of processor elements are formed to be paired such that each of two neighboring processor elements are assigned, respectively, by an odd or even number and that one identical address is assigned to the paired processor elements;

a data transfer bus is assigned to the even-numbered processor elements and another data transfer bus is assigned to the odd-numbered processor elements; and said data holding unit in said paired processor elements addressed by said addressing unit carries out any one of acquiring and outputting data by way of one corresponding data transfer bus.

8. The SIMD processor according to claim 6, wherein each of said plurality of processor elements includes a predetermined number of data holding units.

9. The SIMD processor according to claim 8, wherein processing operation of data in each processor element is carried out by dividing the data into predetermined units, acquiring data from said data holding units, and processing the data by the processing unit.

10. A SIMD processor comprising:

plurality of processor element means each having, processing means for processing data, and data holding means for holding any of data to be processed and already processed by said processing means;

data transfer bus means interconnecting said processor element means; and addressing means for addressing any one of said processor element means, wherein said data holding means of said specific one of said processor element means addressed by said addressing means carry out any one of acquiring and outputting data by way of said data transfer bus means.

11. The SIMD processor according to claim 10, wherein said data holding means comprises first data holding means for holding data to be processed and second data holding means for holding data already processed by said processing means.

12. The SIMD processor according to claim 10, wherein:

said plurality of processor element means are formed to be paired such that each of two neighboring processor elements are assigned, respectively, by an odd or even number and that one identical address is assigned to said paired processor element means;

data transfer bus means is assigned to the even-numbered processor element means and another data transfer bus means is assigned to the odd-numbered processor element means; and said data holding means in said paired processor element means addressed by said addressing means carry out any one of acquiring and outputting data by way of one of corresponding data transfer bus means.

13. The SIMD processor according to claim 10, wherein each of said processing means includes a predetermined number of data holding means.

14. The SIMD processor according to claim 13, wherein processing operation of data in each processor element is carried out by dividing data into predetermined units, acquiring the data from said data holding means, and processing the data by the processing means.

15. A SIMD processor comprising:

plurality of processor element means each having, processing means for processing data, and data holding means for holding any of data to be processed and already processed by said processing means;

data transfer bus means interconnecting said processor element means;

addressing means for addressing any one of said processor element means; and signal generating means for inputting to said data holding means any of input signals for acquiring data to be processed from said data transfer bus means to subsequently hold the data in said data holding means and output signals for outputting processed data held in said data holding means to said data transfer bus means, wherein said addressing means address a specific processor element, said data holding means of said specific processor element means addressed by said addressing means carries out any one of acquiring and outputting data by way of said data transfer bus means in response to the signal inputted to said data holding means from said signal generating means.

16. The SIMD processor according to claim 15, wherein:

said plurality of processor element means are formed to be paired such that each of two neighboring processor elements are assigned, respectively, by an odd or even number and that one identical address is assigned to said paired processor element means;

data transfer bus means is assigned to the even-numbered processor element means and another data transfer bus means is assigned to the odd-numbered processor element means; and said data holding means in said paired processor element means addressed by said addressing means carry out any one of acquiring and outputting data by way of one of corresponding data transfer bus means.

17. The SIMD processor according to claim 15, further comprising:

a predetermined number of data holding means.

18. The SIMD processor according to claim 17, wherein processing operation of the data is carried out by dividing the data into predetermined units, acquiring the data from said data holding means by, and processing the data by the divided units.

* * * * *